US009149802B2

(12) United States Patent
Weber

(10) Patent No.: US 9,149,802 B2
(45) Date of Patent: Oct. 6, 2015

(54) FLOW CELL WITH A TEMPERATURE-CONTROL CHAMBER

(71) Applicant: thinXXS Microtechnology AG, Zweibrücken (DE)

(72) Inventor: Lutz Weber, Zweibrücken (DE)

(73) Assignee: THINXXS MICROTECHNOLOGY AG, Zweibrücken (DE)

( * ) Notice: Subject to any disclaimer, the term of this patent is extended or adjusted under 35 U.S.C. 154(b) by 213 days.

(21) Appl. No.: 13/856,194

(22) Filed: Apr. 3, 2013

(65) Prior Publication Data

US 2013/0263940 A1 Oct. 10, 2013

(30) Foreign Application Priority Data

Apr. 5, 2012 (EP) ..................................... 12163321

(51) Int. Cl.

| | |
|---|---|
| ***F16K 49/00*** | (2006.01) |
| ***B01L 3/00*** | (2006.01) |
| ***B01L 7/00*** | (2006.01) |

(52) U.S. Cl.

CPC ............. *B01L 3/50* (2013.01); *B01L 3/502707* (2013.01); *B01L 7/00* (2013.01); *B01L 7/52* (2013.01); *B01L 2200/0684* (2013.01); *B01L 2300/0816* (2013.01); *B01L 2300/0877* (2013.01); *B01L 2300/0887* (2013.01); *B01L 2300/185* (2013.01); *B01L 2300/1822* (2013.01); *Y10T 137/6579* (2015.04)

(58) Field of Classification Search

CPC .............. F16K 31/002; F16K 99/0044; F16K 2099/008; F04B 19/24; B01L 3/50; B01L 3/502738; B01L 2300/1805

USPC ................. 137/334, 340, 341; 251/61.1, 331; 165/164, 185; 92/103 F

See application file for complete search history.

(56) References Cited

U.S. PATENT DOCUMENTS

| | | | | |
|---|---|---|---|---|
| 5,074,196 | A * | 12/1991 | Michalovic et al. | 92/98 R |
| 6,575,188 | B2 * | 6/2003 | Parunak | 137/251.1 |
| 6,613,560 | B1 | 9/2003 | Tso et al. | |
| 8,440,149 | B2 * | 5/2013 | Handique | 422/504 |
| 2010/0311616 | A1 | 12/2010 | Ozawa et al. | |
| 2011/0303306 | A1 * | 12/2011 | Weber | 137/343 |
| 2012/0266974 | A1 * | 10/2012 | Kitamoto | 137/341 |

FOREIGN PATENT DOCUMENTS

| | | |
|---|---|---|
| EP | 1710016 | 10/2006 |
| EP | 1878495 | 1/2008 |
| EP | 1878497 | 1/2008 |
| WO | 0201181 | 2/2002 |
| WO | 2008006617 | 1/2008 |

* cited by examiner

*Primary Examiner* — John K Fristoe, Jr.
*Assistant Examiner* — Reinaldo Sanchez-Medina
(74) *Attorney, Agent, or Firm* — Lucas & Mercanti, LLP; Klaus P. Stoffel

(57) ABSTRACT

A flow cell with a temperature-control chamber for holding a fluid, the temperature of which is to be controlled, whose boundary wall is formed at least partially by a thin foil for transferring heat between a temperature-control element and the fluid. The foil has several layers joined with one another, such that the layer that faces the fluid is a plastic layer, and at least one other layer is of a metal.

19 Claims, 5 Drawing Sheets

FLOW CELL WITH A TEMPERATURE-CONTROL CHAMBER

CROSS-REFERENCE TO RELATED APPLICATIONS

The present application claims priority of EP 12 163 321.8, filed Apr. 5, 2012, the priority of this application is hereby claimed and this application is incorporated herein by reference.

BACKGROUND OF THE INVENTION

The invention concerns a flow cell with a temperature-control chamber for holding a fluid, the temperature of which is to be controlled, whose boundary wall is formed at least partially by a thin foil for transferring heat between a temperature-control element and the fluid.

Microfluidic flow cells are being used to a greater and greater extent, especially as disposable products, for analytical and diagnostic purposes or in medicine for conditioning liquids before they are applied in the human body as well as for synthetic purposes. While the function of a flow cell can be limited to controlling the temperature of a fluid, temperature control devices are often only components of flow cells that have a much more extensive functionality. Especially for carrying out molecular genetic analyses, including PCR processes or other processes for nucleic acid amplification, the temperature-control function is extremely important because the amplification reaction requires constant or variable reaction temperatures above ambient temperature, typically between 30° C. and 95° C. The manufacture of temperature resistant flow cells with reproducible temperature-control characteristics that allow an especially rapid and homogeneous temperature transition between an active temperature-control element and the fluid whose temperature is to be controlled, especially the manufacture of such flow cells as inexpensive disposable products, presents significant problems.

U.S. Pat. No. 6,613,560 B1 discloses a flow cell with a temperature-control device of the aforementioned type. The flow cell is used for carrying out PCR processes. A reaction chamber for the PCR process simultaneously serves as the temperature-control chamber. The temperature-control chamber is bounded by a recess in a substrate and by a thin, heat-transmitting foil of the type mentioned above, which covers the recess. A disadvantage for the temperature-control process is the low thermal conductivity of plastics, for which reason foils with a low film thickness in the range of 50-200 μm are preferred. The fabrication, handling, and assembly of such thin foils is very complicated. It is a disadvantage that the cover foil does not form an exactly planar surface due to its low mechanical stiffness. Likewise, thermal and mechanical effects occurring during the assembly of the foil by adhesive or welding processes can easily lead to deformations of the foil and thus to deviations from the plane on the order of a few 10-100 μm. This makes it more difficult to introduce heat by pressing a temperature-control element against it; above all, air gaps left in the foil impair heat transmission and prevent rapid equalization between the temperature of the temperature-control element and the temperature of the fluid in the temperature-control chamber, especially its even heating or cooling. It is not possible to realize reproducible temperature-control characteristics, especially under the conditions of inexpensive mass production of this flow cell.

SUMMARY OF THE INVENTION

The objective of the invention is to create a new flow cell with temperature-control function that can be manufactured as an inexpensive mass-produced product with reproducible temperature-control characteristics.

The flow cell of the invention for achieving this objective is characterized in that the foil is realized as a composite foil with several layers joined with one another, such that the layer that faces the fluid is a plastic layer, and at least one other layer consists of a metal.

In accordance with the invention, the metal layer of the foil allows rapid heat transfer, including laterally, i.e., parallel to the plane of the foil, due to its greater thermal conductivity compared to the plastic, typically about 1,000 times greater. Therefore, even when a temperature-control element lies only partially against the foil, the foil takes on the temperature of the temperature-control element sufficiently quickly and uniformly and further transfers it to the fluid. Production-related fluctuations of the size of the contact area between the temperature-control element and the foil are unimportant.

In a preferred embodiment of the invention, the plastic layer facing the fluid is a plastic that is compatible with the amplification reaction, preferably an olefin polymer, such as PP, PE, COC, or PC.

The one or more metal layers preferably contain aluminum or a magnetizable metal, e.g., nickel. In the latter case, magnetic force makes it possible to enhance the adherence of a temperature-control element to the foil and thus the heat transfer between the temperature-control element and the foil.

The layer of the composite foil which faces the temperature-control element can also consist of a plastic, especially the same plastic used as the layer of the composite foil that faces the fluid. It is advantageous for the layer that faces the temperature-control element to consist of a material that prevents adhesive attachment of the foil to the temperature-control element.

In a preferred embodiment of the invention, the thickness of each of the layers constituting the foil is 1 μm to 100 μm.

It would be possible to fabricate the temperature-control chamber solely from the thin composite foil, for example, from two foil parts deep-drawn in opposite directions and joined to each other by welding or adhesive bonding. However, in the preferred embodiment of the invention, the temperature-control chamber is formed by a recess in a substrate and a composite foil that covers the recess. The composite foil is joined with the substrate, preferably by welding or adhesive bonding. The substrate is preferably produced by an inexpensive injection-molding process.

The foil is preferably joined with a flat surface of the substrate adjacent to the recess.

The substrate can consist of the same plastic as the layer of the composite foil that faces the fluid, so that the whole temperature-control chamber can be made of only a single material that is compatible with the fluids whose temperature is to be controlled.

In one embodiment of the invention, the temperature-control element has a solid temperature-control body that can be placed against the composite foil to allow heat transfer or it has a liquid or gaseous temperature-control fluid that preferably flows parallel to the composite foil and wets or contacts it.

In one embodiment of the invention, the temperature-control element can be placed only in a peripheral area which is adjacent to the temperature-control chamber and in which the composite film is joined, e.g., with the surface of the substrate. It is advantageous for the foil to be supported in the peripheral area in such a way that the temperature-control element can be applied to the foil with high contact pressure. If the temperature-control chamber is hermetically sealed during the temperature-control process, the application of the temperature-control element to only a part of the composite foil that forms the temperature-control chamber has the advantage that a buildup of pressure produced by the heating and attendant expansion of the fluid in the chamber can be at least partially compensated by expansion of the composite foil and the associated increase in the volume of the temperature-control chamber. The prevention of this pressure buildup in the temperature-control chamber in turn reduces the requirements on valves that may be necessary for hermetic sealing of the chamber.

The composite foil can be expanded into the temperature-control chamber by the temperature-control element, preferably as far as a stop that limits the expansion. This expansion makes it possible to achieve reproducible thermal contact between the temperature-control element and the foil. In addition, other spaces separated from the temperature-control chamber can be provided, into which the composite foil can be expanded.

In a further modification of the invention, devices for applying suction to the composite foil can be formed on the temperature-control body. This provides firmer pressure of the temperature-control body against the foil to improve the thermal contact. If the composite foil has a magnetizable metal layer, the temperature-control body can be provided with a permanent magnet or electromagnet to improve the pressure of the temperature-control body against the foil by magnetic interaction.

In one embodiment of the invention, the composite foil is shaped, especially by deep drawing, to increase its surface in contact with the fluid.

The composite foil can perform other functions within the flow cell, e.g., covering functions or a valve function.

It goes without saying that the flow cell with the temperature-control chamber can have an inlet and an outlet for the fluid, possibly to allow the fluid to pass through the chamber during the temperature-control process. Furthermore, the flow cell can also have channel structures, mixing and distributing elements for the fluids, liquid reservoirs, reaction and detection chambers, and other elements of these types which are customary in the state of the art for conducting analyses and syntheses in microfluidic flow cells. It is advantageous for the composite foil to extend only over the portion of the flow cell that contains the temperature-control chamber to ensure that little or no heat flows into the other regions of the flow cell during the temperature-control process.

Since the temperature control of a fluid in a temperature-control chamber is always accompanied by a change in the volume of the fluid, it can be advantageous if the temperature-control chamber can be hermetically sealed from adjacent channel areas and/or functional areas during the temperature-control process. This can be necessary especially when a fluid is being heated to a temperature approaching its boiling point. This makes it possible to prevent the escape of fluid from the temperature-control chamber as a result of volume change and/or partial vaporization. When the seal is removed after the temperature-control process, the fluid can be further conveyed, processed, or analyzed, as, for example, in the case of molecular genetic analyses. To allow sealing, it is advantageous to form a valve seat in the channel-like inlet and outlet of the temperature-control chamber; in the area of the valve seat, the composite foil is not tightly joined with the substrate but rather lies loosely and flatly on the substrate. The expandability of the composite foil makes it possible for a fluid under pressure to pass through between the valve seat and the composite foil before or after the temperature-control process and to be conveyed into the chamber or out of the chamber. During the temperature-control process, the inlet and outlet are hermetically sealed by pressing mechanical stamps of an external actuating device against the composite foil lying on the substrate in the area of the valve seats.

The temperature-control chamber of the invention can also serve as a liquid reservoir, for example, for storing a reagent before its use in the flow cell. In this regard, the volume of the stored reagent can be smaller than that of the temperature-control and storage chamber, so that the chamber can be completely or partially further filled with a fluid to be analyzed and mixed with the reagent, e.g., before a temperature-control process is carried out. When the temperature-control chamber is used as a reservoir, it can be advantageous for a channel-like inlet and outlet of the temperature-control chamber to be geometrically interrupted and for the composite foil to be tightly joined with the substrate in the interrupted region of the channel, e.g., by welding with the formation of a sealing seam that seals the channel. After the sealing seam has been opened, the fluids can be conveyed into the chamber and out of the chamber by means of pressure, and thereafter the sealing points can be used as valves. The metal layer in the composite foil that bounds the reservoir prevents liquid or gas from passing through the wall of the chamber during storage.

The various features of novelty which characterize the invention are pointed out with particularity in the claims annexed to and forming a part of the disclosure. For a better understanding of the invention, its operating advantages, specific objects attained by its use, reference should be had to descriptive matter in which there are described preferred embodiments of the invention.

DETAILED DESCRIPTION OF THE INVENTION

Figure 1:
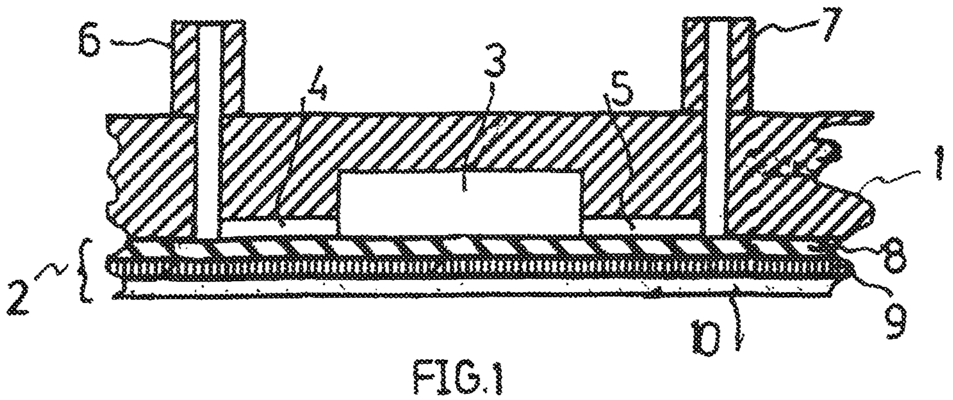
FIG. 1 is a cutaway view of a flow cell of the invention with a temperature-control chamber.

FIG. 1 is a cutaway view of a microfluidic flow cell that comprises a plate-shaped substrate 1 and a foil 2 that is welded or adhesively bonded fluidtight with the substrate 1. The illustrated embodiment is intended for carrying out an amplification process.

A temperature-control chamber 3 that can hold a fluid is formed by a recess in the substrate 1 and the foil 2, which covers the recess. The temperature-control chamber 3 is connected to an inlet 6 and an outlet 7 via channels 4 and 5, respectively. It goes without saying that the temperature-control chamber could be designed differently from the design shown here by being connected or capable of connection with other chambers provided in the flow cell for other purposes.

In the illustrated embodiment, the foil 2 consists of a composite of several layers, an inner layer 8 that consists of a plastic that is compatible with amplification reactions, a metal layer 9, which in the present example consists of aluminum, and an outer layer 10, which, like the inner layer, consists of plastic. The inner layer 9 and the substrate 1 can be made of the same material to facilitate the fluidtight sealing of the foil 2 with the substrate 1.

In the following FIGS. 2 to 6, the composite foil 2, which comprises several layers, is shown without the individual layers for the sake of simplicity.

Figure 2:
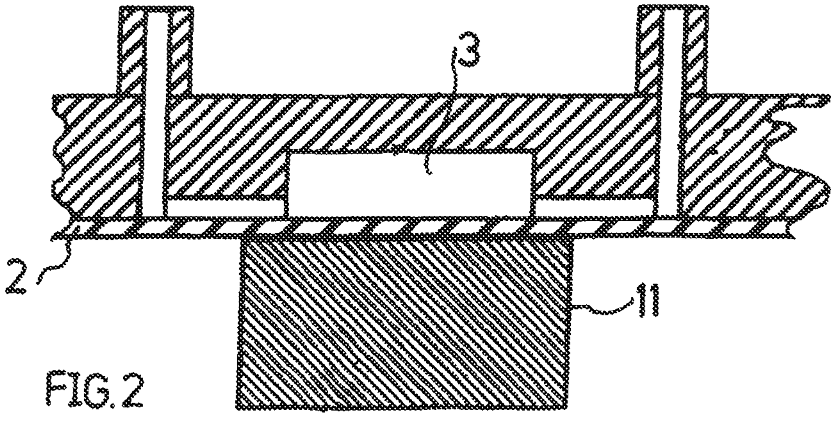
FIG. 2 shows the flow cell of FIG. 1 with a temperature-control element applied to it.

In order to bring a fluid contained in the temperature-control chamber 3 to a desired temperature, e.g., a reaction temperature required as part of the overall function of the flow cell, a temperature-control element 11 is placed against the wall of the temperature-control chamber 3 formed by the foil 2, as shown in FIG. 2. The temperature-control element is maintained at a temperature that corresponds to the desired temperature of the fluid in the temperature-control chamber 3.

Depending on the desired fluid temperature, the temperature-control element 11 can be a heating element or a cooling element. In the former case, heat is transferred from the temperature-control element 11 to the fluid in the temperature-control chamber 3, and in the latter, the opposite occurs, i.e., heat flows from the fluid to the temperature-control element 11.

Due to high flexibility of the thin foil 2, which has a total layer thickness in the range of 3-300 μm, the temperature-control element 11 cannot be placed sufficiently flat against the foil 2 to allow uniform heat transfer over the entire contact area. However, due to the high thermal conductivity of the foil's metal layer 9, which allows heat to be conducted especially in the lateral direction parallel to the plane of the foil 2, rapid heat exchange nevertheless takes place between the temperature-control element 11 and the fluid in the temperature-control chamber 3, so that the fluid is evenly heated and its temperature approaches the temperature of the temperature-control element 11.

Of course, the fluid can remain stationary in the temperature-control chamber 3 during the temperature-control process or it can flow through the temperature-control chamber 3 at a rate that allows temperature equalization to occur.

Figure 3:
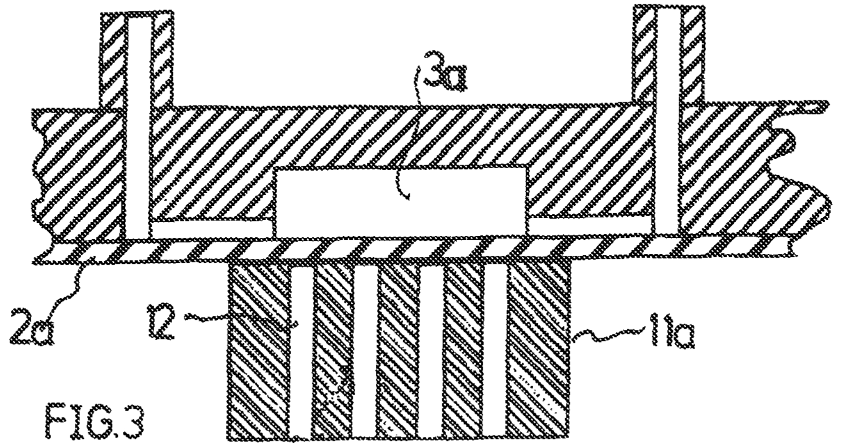
FIG. 3 shows the flow cell of FIG. 1 with a temperature-control element provided with suction channels.

FIG. 3 shows a temperature-control element 11*a* which is provided with suction channels 12, by which an underpressure can be produced to draw the foil 2*a* against the temperature-control element 2*a*, so that uniform heat transfer is obtained over the contact surface between the temperature-control element 11*a* and the foil 2*a*.

In the following figures, parts that are the same or have the same action are labeled with the same reference numbers but with different letter suffixes a, b, etc.

Figure 4:
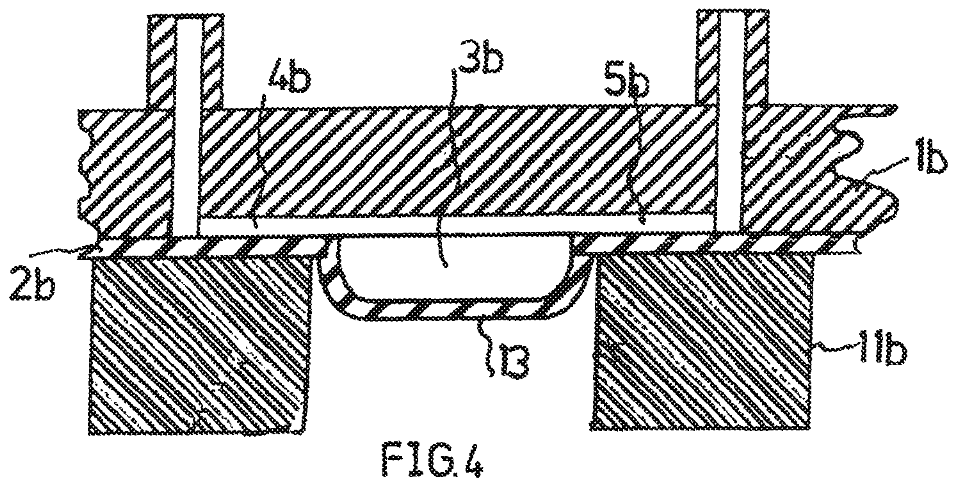
FIG. 4 is an embodiment of a flow cell of the invention with a deep-drawn foil.

FIG. 4 illustrates an embodiment of the invention in which a temperature-control chamber 3*b* is basically formed by a cap-shaped or chamber-shaped deformation 13 of a composite foil 2*b*. An annular temperature-control element 11*b* is positioned around the deformation 13 and lies against the foil 2*b*, which is joined with a substrate 1*b*. The support of the foil 2*b* by the substrate 1*b* allows increased contact pressure of the temperature-control element 11*b* against the foil 2*b*. Therefore, heat is transferred more evenly and is conducted laterally by the metal layer present in the foil 2*b* and quickly reaches the center, so that temperature equalization between a fluid present in the temperature-control chamber 3*b* and the temperature-control element 11*b* can occur in a short time.

Figure 5:
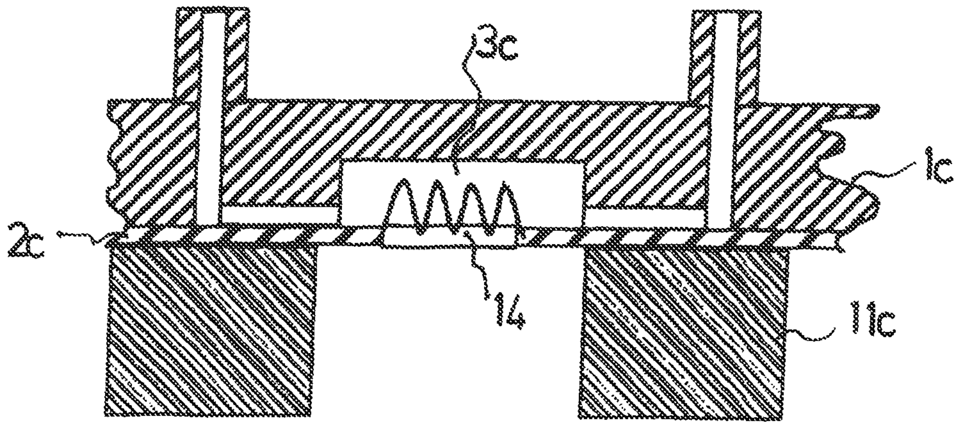
FIG. 5 is another embodiment of a flow cell of the invention with a deep-drawn foil.

Like the embodiment of the invention shown in FIG. 4, the embodiment shown in FIG. 5 uses an annular temperature-control element 11*c*. As in the embodiments illustrated in FIGS. 1 to 3, the temperature-control chamber 3*c* is formed by a recess in a substrate 1*c*. In the area of the recess, the composite foil 2*c* that covers the recess has a deformation 14 that increases the surface of the foil 2*c* next to the fluid and thus increases the intensity of heat transmission, so that the temperature of the fluid in the temperature-control chamber 3*c* approaches the temperature of the temperature-control element 11*c* even faster than in the embodiment according to FIG. 4.

Figure 6:
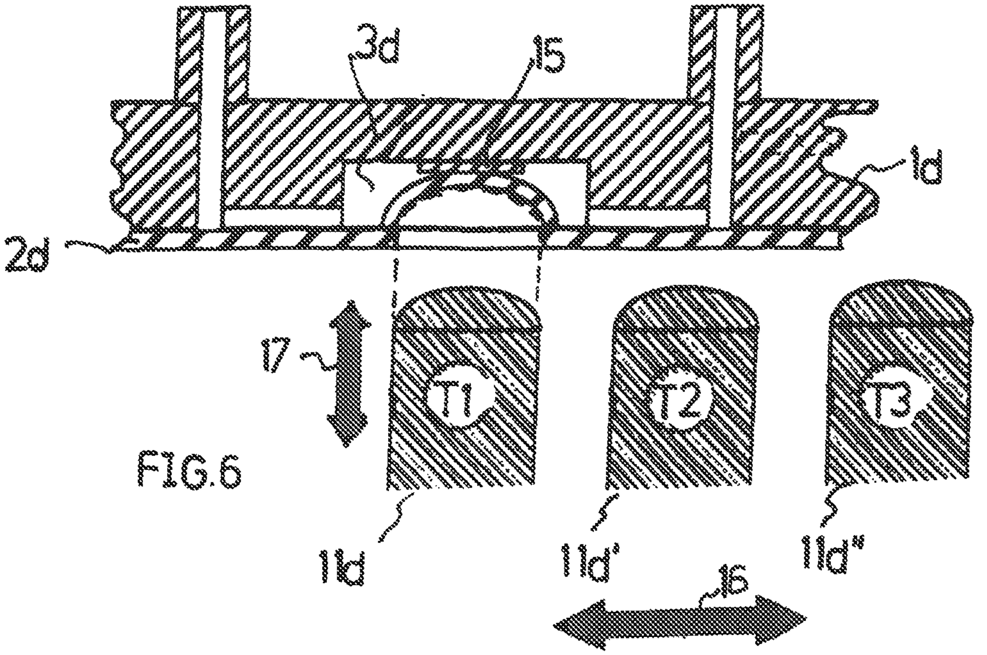
FIG. 6 is an embodiment of a flow cell of the invention with a foil that can expand into a recess in a substrate.

FIG. 6 shows an embodiment of the invention with a foil 2*d*, which, in an area in which it forms a wall of the temperature-control chamber 3*d*, can be caused by a temperature-control element 11*d* to expand into a recess in a substrate 1*d* that forms the temperature-control chamber 3*d*. A stop 15 at the base of the temperature-control chamber 3*d* limits the expansion. In the state of expansion illustrated in FIG. 1, the temperature-control element 11*d* is placed evenly against the elastically or plastically expandable foil 2*d*, so that uniform heat transfer and temperature exchange between the temperature-control element and the fluid occur over the entire contact surface.

An arrangement of the temperature-control element 11*d* and additional temperature-control elements 11*d*' and 11*d*" can be shifted as indicated by arrow 16, to allow the different temperature-control elements 11*d*, 11*d*', and 11*d*" to be optionally extended in the direction of arrow 17 as far as the stop 15. The temperature of the fluid can then be successively adjusted to temperatures T1, T2, and T3 of the corresponding temperature-control elements 11*d*, 11*d*', and 11*d*".

Figure 7:
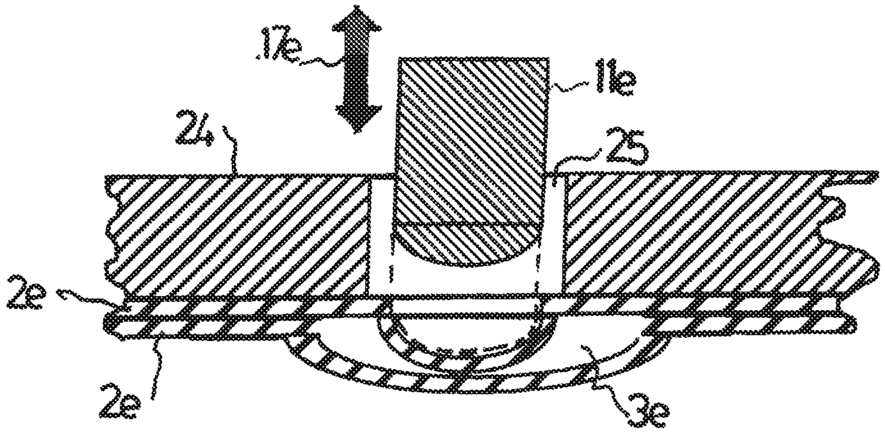
FIG. 7 is an embodiment of a flow cell of the invention with a temperature-control chamber formed from two expandable composite foils by excursion of the temperature-control element.

The specific embodiment of a flow cell illustrated in FIG. 7 comprises a substrate 24 welded or adhesively bonded with an arrangement of composite foils 2*e* and 2*e*'.

The composite foils 2*e*, 2*e*' are also joined to each other by welding or adhesive bonding except in an area in front of a passage opening 25 in the substrate 24 and an adjacent area surrounding the passage opening 25.

A temperature-control element 11*e* that can be moved in the passage opening 25 in arrow direction 17*e* can expand the composite foils 2*e*, 2*e*' in the manner shown in FIG. 7 to form a temperature-control chamber 3*e* between the composite foils 2*e*, 2*e*'. In the illustrated embodiment, the two composite foils 2*e*, 2*e*' are formed with a metal layer like the foil shown in FIG. 1. In a departure from the illustrated embodiment, it would also be possible for only the foil 2*e* that faces the temperature-control element 11*e* to be realized as a composite foil of this type with a metal layer.

Inlets or outlets opening into the temperature-control chamber are not shown in FIG. 7.

Figure 8:
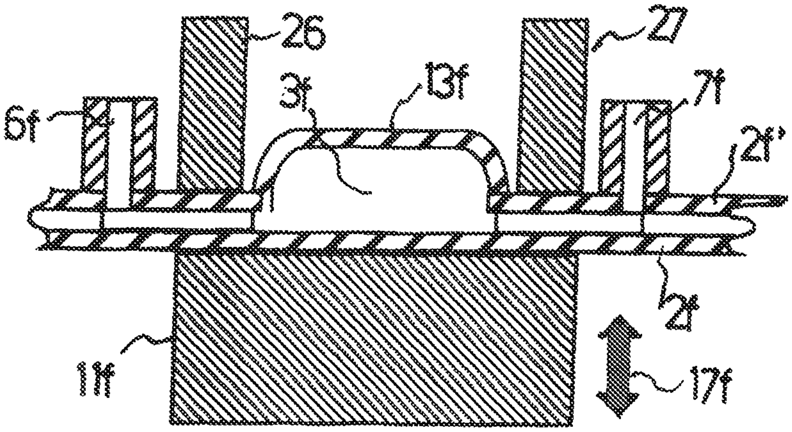
FIG. 8 is an embodiment of a flow cell of the invention with a temperature-control chamber formed from two expandable composite foils and with temperature-control elements arranged on opposite sides.

FIG. 8 shows an embodiment of a flow cell with a temperature-control chamber 3*f*. The temperature-control chamber 3*f* is formed from two composite foils 2*f* and 2*f*' that are joined with each other by welding or adhesive bonding. While composite foil 2*f* is flat, composite foil 2*f*' has a deformation 13*f* formed by deep drawing and, in addition, is connected with inlets and outlets 6*f*, 7*f*.

A temperature-control element 11*f* can be moved in the direction indicated by arrow 17*f*, and two temperature-control elements 26 and 27, which can be placed against the composite foil 2*f*, lie opposite the temperature-control element 11*f* and can be moved in the opposite direction from temperature-control element 11*f*. While the temperature-control element 11*f* covers the entire side of the temperature-control chamber 3*f* that faces it as well as the adjacent areas, the temperature-control elements 26 and 27 lie only against the areas adjacent to the temperature-control chamber 3*f*. Accordingly, heat is conducted laterally into the temperature-control chamber. When pressure buildup occurs in the temperature-control chamber 3*f*, the free area formed by the deep-drawn deformation 13*f* can expand with partial compensation of the pressure.

Figure 9:
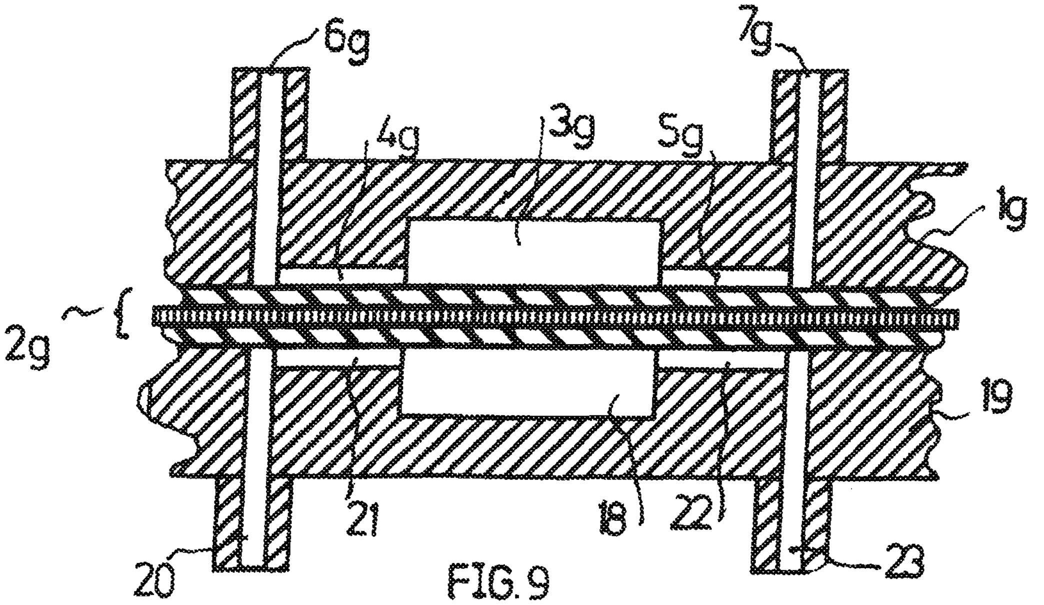
FIG. 9 is a flow cell according to FIG. 1 with a temperature-control element that conveys a temperature-control fluid.

FIG. 9 shows an embodiment of a flow cell that corresponds to the flow cell of FIG. 1. It has a substrate 1*g*, a foil 2*g*, and a temperature-control chamber 3*g*.

However, in the embodiment illustrated here, a temperature-control element 11*g* does not consist of a solid temperature-control body as in the preceding embodiments but rather comprises a chamber 18 that holds a temperature-control fluid and is arranged symmetrically to the temperature-control chamber 3*g*. The chamber 18 is located in a recess in a substrate 19, which is joined with the composite foil 2*g* in the same way as the substrate 1*g*. The chamber 18 holds a fluid kept at a certain temperature. In the specific embodiment illustrated here, the fluid enters the chamber 18 through an inlet 20 and a channel 21 and flows out of the chamber through a channel 22 and an outlet 23. In the illustrated embodiment, the substrate 1*g* and the substrate 19 are made of the same material. An inner layer 8*g* of the foil 2*g* also consists of the same material as the outer layer 10*g* that faces the substrate 19.

Figure 10:
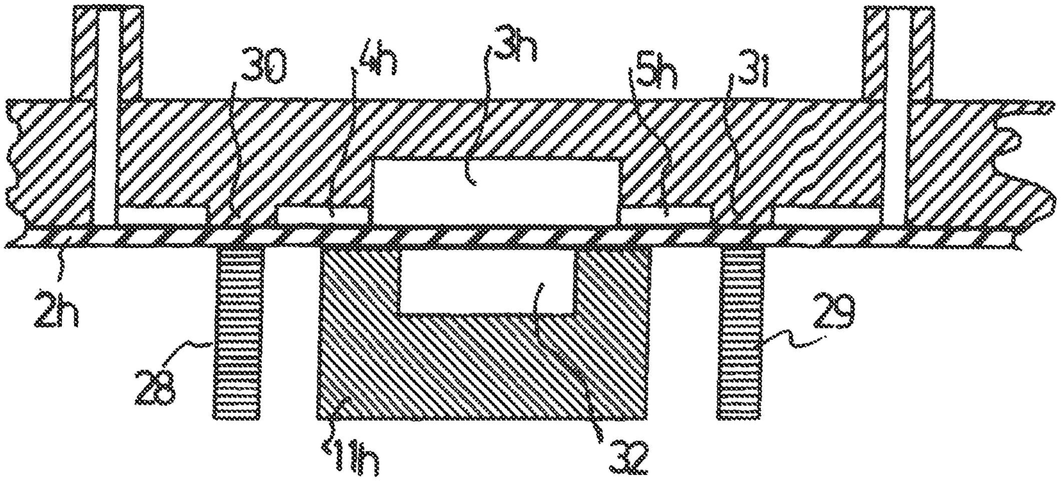
FIG. 10 is a flow cell of the invention with valve zones adjacent to a temperature-control chamber.

The flow cell shown in FIG. 10 differs from the flow cell of FIG. 1 in that the channels 4*h* and 5*h*, which communicate with a temperature-control chamber 3*h*, are each provided with a valve with an actuator element 28 and 29, respectively. Each actuator element presses a composite foil 2*h* against a valve seat 30 or 31 in the closed state of the valve.

A temperature-control element 11*h* has a recess 32 in the center of its temperature-control surface that can be placed against the foil 2*h*. During a temperature-control process, the composite foil 2*h* can expand into the recess 32 as the internal pressure in the pressure-control chamber 3*h* rises.

The actuators 28, 29 can be joined with the temperature-control element 11*h* to form a single piece and can be moved together with it.

Figure 11:
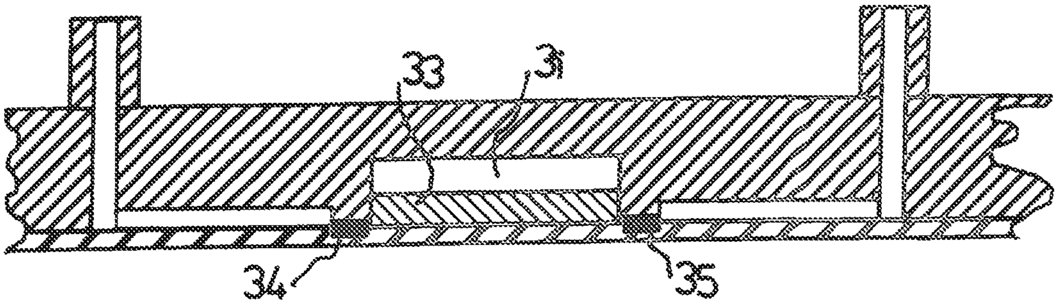
FIG. 11 is a flow cell of the invention with a temperature-control chamber that serves as a reservoir.

FIG. 11 shows a flow cell with a chamber 3*i* that serves first as a reservoir for a reagent. Openings can be formed at break points 34 and 35 to allow access to the reagent 33 and to allow further use of the chamber 3*i* as a temperature-control chamber.

While specific embodiments of the invention have been shown and described in detail to illustrate the inventive principles, it will be understood that the invention may be embodied otherwise without departing from such principle.

I claim:

1. A flow cell with a temperature-control chamber for holding a fluid, the temperature of which is to be controlled, a boundary wall of the chamber being formed at least partially by a thin composite foil for transferring heat between a temperature-control element and the fluid, wherein the temperature control element is arranged on a surface of the composite foil that faces away from the fluid, wherein the foil composite has several layers joined with one another, wherein a layer that faces the fluid is a plastic layer and is the only one of several layers that contacts the fluid, and wherein at least one other layer is a metal.

2. The flow cell in accordance with claim 1, wherein the plastic layer that faces the fluid is a plastic that is compatible with an amplification reaction.

3. The flow cell in accordance with claim 2, wherein the plastic is an olefin polymer.

4. The flow cell in accordance with claim 3, wherein the plastic is one of PP, PE, COC or PC.

5. The flow cell in accordance with claim 1, wherein the at least one metal layer consists of aluminum or a magnetizable metal.

6. The flow cell in accordance with claim 1, wherein the foil layers include a plastic layer that faces the temperature-control element.

7. The flow cell in accordance with claim 6, wherein the layer that faces the temperature-control element is of the same plastic as the layer that faces the fluid.

8. The flow cell in accordance with claim 1, wherein each of the layers of the foil has a thickness of 1 μm to 100 μm.

9. The flow cell in accordance with claim 1, wherein the temperature-control chamber is formed by a recess in a substrate and the composite foil that covers the recess, the composite foil being joined with the substrate.

10. The flow cell in accordance with claim 1, comprising at least one valve arranged to close the temperature-control chamber, and a valve seat, against which the composite foil lies loosely, is formed in a channel that is connected with the temperature-control chamber and is covered by the composite foil.

11. The flow cell in accordance with claim 9, wherein the substrate consists of the same plastic as the layer of the composite foil that faces the fluid.

12. The flow cell in accordance with claim 9, wherein the temperature-control element has a solid temperature-control body placeable against the composite foil to allow heat transfer or has a temperature-control fluid that flows parallel to and wets the composite foil.

13. The flow cell in accordance with claim 12, wherein the temperature-control element is placed only in a peripheral area which is adjacent to the temperature-control chamber and in which the composite film foil is joined with a surface of the substrate.

14. The flow cell in accordance with claim 1, wherein the composite foil is expandable into the temperature-control chamber by the temperature-control element, as far as a stop that limits the expansion.

15. The flow cell in accordance with claim 1, wherein the temperature-control chamber is a reservoir and at least one seal is provided that seals the reservoir and forms a break point for forming an opening.

16. The flow cell in accordance with claim 1, wherein the composite foil is shaped to increase surface area in contact with the fluid.

17. The flow cell in accordance with claim 1, wherein the composite foil is provided so as to perform at least one other function within the flow cell, wherein the other function is a covering function and/or a valve function.

18. The flow cell in accordance with claim 1, wherein the chamber has an inlet and an outlet for the fluid to allow the fluid to pass through the chamber during a temperature-control process.

19. The flow cell in accordance with claim 9, wherein the composite foil is joined to the substrate by welding or adhesive bonding.

* * * * *